(12) United States Patent
Llagostera et al.

(10) Patent No.: US 10,320,636 B2
(45) Date of Patent: Jun. 11, 2019

(54) STATE INFORMATION COMPLETION USING CONTEXT GRAPHS

(71) Applicant: CA, INC., New York, NY (US)

(72) Inventors: Jaume Ferrarons Llagostera, Barcelona (ES); David Solans Noguero, Barcelona (ES); David Sanchez Charles, Barcelona (ES); Alberto Huelamo Segura, Barcelona (ES); Marc Sole Simo, Barcelona (ES); Victor Muntes Mulero, Barcelona (ES)

(73) Assignee: CA, INC., New York, NY (US)

( * ) Notice: Subject to any disclaimer, the term of this patent is extended or adjusted under 35 U.S.C. 154(b) by 163 days.

(21) Appl. No.: 15/392,585

(22) Filed: Dec. 28, 2016

(65) Prior Publication Data
US 2018/0176108 A1    Jun. 21, 2018

(51) Int. Cl.
*H04L 29/08* (2006.01)
*H04L 12/26* (2006.01)

(52) U.S. Cl.
CPC .................................. *H04L 43/08* (2013.01)

(58) Field of Classification Search
CPC .......... H04L 43/08; H04L 67/02; H04L 67/10
See application file for complete search history.

(56) References Cited

U.S. PATENT DOCUMENTS

| | | | |
|---|---|---|---|
| 9,231,833 B1 | 1/2016 | Bandopadhyay | |
| 9,383,970 B2 * | 7/2016 | Joy | G06F 8/20 |
| 9,762,450 B2 * | 9/2017 | Xie | H04L 41/12 |
| 9,817,805 B1 | 11/2017 | Markman et al. | |
| 2005/0198244 A1 | 9/2005 | Eilam et al. | |
| 2010/0121972 A1 | 5/2010 | Samuels et al. | |
| 2012/0137367 A1 | 5/2012 | Dupont et al. | |
| 2012/0151026 A1 | 6/2012 | Chen et al. | |
| 2013/0031454 A1 | 1/2013 | Griffiths et al. | |
| 2014/0068032 A1 | 3/2014 | Kannan et al. | |

(Continued)

OTHER PUBLICATIONS

Rogers, David, and Mathew Hahn. "Extended-connectivity fingerprints." Journal of chemical information and modeling 50.5 (2010): 742-754.

(Continued)

*Primary Examiner* — Adnan M Mirza
(74) *Attorney, Agent, or Firm* — Shook, Hardy & Bacon L.L.P.

(57) ABSTRACT

Incomplete state information for nodes of a datacenter is completed utilizing historical state information. A context graph is received having a plurality of nodes that correspond to components of the datacenter, each node including properties that correspond to the represented component. It is determined that at least one of the properties for a node is incomplete. A context hash is derived from the context graph and compared to a plurality of subgraph hashes. Based upon the comparison, one or more subgraphs are identified that are similar to the context hash. Where a single similar subgraph is identified, the property information for the single subgraph is imputed to the context graph to complete the incomplete information. Where more than one similar subgraph is identified, the property information for the identified similar subgraphs is aggregated and the aggregated property information is imputed to the context graph to complete the incomplete information.

10 Claims, 10 Drawing Sheets

(56) References Cited

U.S. PATENT DOCUMENTS

| | | | |
|---|---|---|---|
| 2014/0164352 | A1 | 6/2014 | Denninghoff |
| 2014/0282586 | A1 | 9/2014 | Shear et al. |
| 2016/0110434 | A1 | 4/2016 | Kakaraddi et al. |
| 2016/0359872 | A1 | 12/2016 | Yadav et al. |
| 2017/0322241 | A1 | 11/2017 | Tang et al. |
| 2018/0284743 | A1 | 10/2018 | Cella et al. |
| 2018/0284745 | A1 | 10/2018 | Cella et al. |

OTHER PUBLICATIONS

Duvenaud, David K., et al. "Convolutional networks on graphs for learning molecular fingerprints." Advances in Neural Information Processing Systems. 2015.

Xu, Kelvin, et al. "Show, attend and tell: Neural image caption generation with visual attention." arXiv preprint arXiv:1502.03044 2.3 (2015): 5.

Symmetric difference Wiki Page: https://www.wikiwand.com/en/Symmetric_difference.

Yll Haxhimusa. The Structurally Optimal Dual Graph Pyramid and its Application in Image Partitioning. Vienna University of Technology, Faculty of Informatics, Institute of Computer Aided Automation, Pattern Recognition and Image Processing Group. PhD Thesis, Chapter 2, 2006 (c) http://www.prip.tuwien.ac.at/twist/docs/graph_theory_basic_notions.pdf.

Learning to rank Wiki Page: https://www.wikiwand.com/en/Learning_to_rank.

Debnath, Sandip, "Automatic Text-based Explanation of Events," A Thesis in Computer Science and Engineering, Dec. 2005, 200 pages. https://etda.libraries.psu.edu/files/final_submissions/6051.

Portet, Francois et al., "Automatic Generation of Textual Summaries from Neonatal Intensive Care Data," 46 pages. http://homepages.abdn.ac.uk/e.reiter/pages/papers/aij-bt45.pdf (2015).

Wang, Nan et al., "An Anomaly Detection Algorithm Based on Lossless Compression," 2012 IEEE Seventh International Conference on Networking, Architecture, and Storage, 8 pages. http://ieeexplore.ieee.org/abstract/document/6310873/.

Karpathy, Andrej et al., "Deep Visual-Semantic Alignments for Generating Image Descriptions," 17 pages. http://cs.stanford.edu/people/karpathy/cvpr2015.pdf.

Fei, Hongliang Fei et al., "Structure feature selection for graph classification," CIKM'08, Oct. 26-30, 2008, Napa Valley, California, USA. http://ittc.ku.edu/~jhuan/papers/cikm08_fei.pdf.

Frequent subgraph mining, 75 pages. https://www.csc.ncsu.edu/faculty/samatova/practical-graph-mining-with-R/slides/pdf/Frequent_Subgraph_Mining_pdf.

Huan, Jun et al., "Efficient Mining of Frequent Subgraph in the Presence of Isomorphism," 12 pages. https://www.ittc.ku.edu/~jhuan/papers/03-021.pdf.

Bodik, Peter, et al. "Fingerprinting the datacenter: automated classification of performance crises." Proceedings of the 5th European conference on Computer systems. ACM, 2010.

Non-Final Office Action dated Oct. 12, 2018 in U.S. Appl. No. 15/392,577, 20 pages.

Non-Final Office Action dated Nov. 16, 2018 in U.S. Appl. No. 15/392,591, 21 pages.

\* cited by examiner

| node | A | B | C | D | E |
|---|---|---|---|---|---|
| 310 — It. 0 | H(1) | H(3) | H(2) | H(1) | H(1) |
| 320 — It. 1 | H(H(1)H(3)) | H(H(3)H(1)H(1)H(2)) | H(H(2)H(1)H(3)) | H(H(1)H(2)) | H(H(1)H(3)) |

FIG. 3

| | #N, it. 0 | #N, it. 1 | CPU, it. 0 | CPU, it. 1 |
|---|---|---|---|---|
| Node A | H(1) | H(H(1)H(3)) | H(40%) | H(H(40%)H(60%)) |
| | 410 | 412 | 420 | 422 |

STATE INFORMATION COMPLETION USING CONTEXT GRAPHS

RELATED APPLICATION

This application claims priority to Spanish Application No. P 201631642, filed Dec. 21, 2016.

BACKGROUND

Datacenters are large clusters of components (e.g., hardware and/or software resources) that are connected to perform operations using massive amounts of data. Keeping these components working efficiently is a complex task as many incidents may occur during the execution of the processes. In order to detect anomalies, problems, and/or failures, or to otherwise assess the health of the system, tools are utilized that extract and gather metrics from the datacenter components. Metrics may include, by way of example only, the temperature of datacenter components, workload, network usage, processor capacity, and the like. The set of metrics at a given timestamp forms the state of the datacenter at the point in time represented by the timestamp.

Keeping datacenter state information completed and fully updated is a challenging task for a number of reasons. For instance, reporting tools often include differing reporting rates among them and/or among different metrics. Further, reporting frequency may not be high enough to accurately assess the datacenter and yet maintaining a high reporting frequency may negatively impact performance of the datacenter. The growing usage of large systems and infrastructures increases the importance of keeping accurate measures in order to find anomalies which may affect the outcome of the tasks executed or to avoid damage to the system itself.

SUMMARY

This summary is provided to introduce a selection of concepts in a simplified form that are further described below in the detailed description. This summary is not intended to identify key features or essential features of the claimed subject matter, nor should it be used as an aid in determining the scope of the claimed subject matter.

Embodiments of the present disclosure relate to completing incomplete state information for nodes of a datacenter (each node representing a component of the datacenter in a context graph) utilizing historical state information. A context graph is received having a plurality of nodes that correspond to components of a datacenter. The context graph further indicates the relationships among the nodes of the datacenter and each node includes a plurality of properties that correspond to the component represented thereby. It is determined that at least one of the properties for at least one of the nodes of the context graph is incomplete. A context hash is derived from the context graph and compared to a plurality of subgraph hashes derived from a library of subgraphs. Based upon the comparison, one or more subgraphs are identified that enjoy at least threshold similarity to the context hash.

In the event a single similar subgraph is identified, the property information for the single subgraph is imputed to the context graph to complete the incomplete information. In the event more than one similar subgraph is identified, the property information for the identified similar subgraphs is aggregated, for instance, utilizing an average or weight based on a percentage of matching nodes. The aggregated property information for the identified similar subgraphs is imputed to the context graph to complete the incomplete information.

BRIEF DESCRIPTION OF THE DRAWINGS

The present invention is described in detail below with reference to the attached drawing figures, wherein.

DETAILED DESCRIPTION

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. For example, although this disclosure refers to generating context graphs that represent datacenters in illustrative examples, aspects of this disclosure can be applied to generating context graphs that represent relationships between components in a local hardware or software system, such as a storage system or distributed software application. Moreover, although the terms "step" and/or "block" may be used herein to connote different elements of methods employed, the terms should not be interpreted as implying any particular order among or between various steps herein disclosed unless and except when the order of individual steps is explicitly described. As used herein, the singular forms "a," "an," and "the" are intended to include the plural forms as well, unless the context clearly indicates otherwise.

The term "component" as used herein encompasses both hardware and software resources. The term component may refer to a physical device such as a computer, server, router, etc., a virtualized device such as a virtual machine or virtualized network function, or software such as an application, a process of an application, database management system, etc. A component may include other components. For example, a server component may include a web service component which may include a web application component.

The term "context graph" refers to a data structure that depicts connections or relationships between components. A context graph consists of nodes (vertices, points) and edges (arcs, lines) that connect them. A node represents a component, and an edge represents a relationship between the corresponding components. Nodes and edges may be labeled or enriched with data or properties. For example, a node may include an identifier for a component, and an edge may be labeled to represent different types of relationships, such as a hierarchical relationship or a cause-and-effect type relationship. In embodiments where nodes and edges are enriched with data, nodes and edges may be indicated with data structures that allow for the additional information, such as JavaScript Object Notation ("JSON") objects, extensible markup language ("XML") files, etc. Context graphs also may be referred to in related literature as a triage map, relationship diagram/chart, causality graph, etc.

The term "subgraph" refers to a portion of a context graph. Subgraphs may be stored in a historical database as training data and may be aggregated to facilitate data imputation for missing data in a context graph. Subgraphs may additionally be utilized to diagnose particular problems in a datacenter. For example, if a particular problem occurs, the subgraphs that generate a particular hash for the particular problem may be provided to help identify a source of the problem in the datacenter.

Properties of a subgraph or context graph may be described by a "hash." A hash may be determined based on a particular property or properties of a node. The properties may be metrics of the node itself or information related to one or more neighbors of the node. If related to multiple node neighbors, the information may be aggregated. The aggregated neighbor-related information may include, by way of example only, a number of neighbors of the node, an absolute number of neighbors having a particular condition, a relative number of neighbors having a particular condition, a sum/maximum/minimum/average of one or more node properties, and the like. For clarity, a "neighbor" corresponds to a node that is directly connected to the subject node by an edge. The edge may correspond to relationships among hardware and software components between the nodes.

A hash may additionally be computed through predetermined number of iterations which may be based on a diameter of the subgraph or context graph, desired input size, etc. For example, at iteration 0, the hash may include a hash of the particular node. At iteration 1, the hash may include a hash of the hash of the particular node and the hash of neighbor nodes. At iteration 2, the hash may include a hash of the hash of the particular node, the hash of the neighbor nodes, and the hash of the neighbors of the neighbor nodes. In this way the hash provides a fingerprint of identifying characteristics of the subgraph or context graph corresponding to properties of nodes of the subgraph or context graph that can be utilized to identify similar subgraphs or context graphs. Subgraphs and/or context graphs may be "similar" to one another when a threshold level of similarity (as measured by similar nodes, similar node properties, similar connections between nodes, and the like) exists between items being measured. The threshold necessary for a similarity determination may be configured to use cases, as desired, and embodiments of the present disclosure are not intended to be limited to any particular threshold similarity.

A "vector representation" or "graph embedding" may correspond to the hash itself or a string of hashes being considered (e.g., hashes of multiple properties or for multiple nodes). In embodiments, a vector representation corresponds to a subgraph or context graph as it evolves over time. For example, as a particular property or node changes over time, the vector representation represents the hash of the particular node as it changes over time which may help diagnose a particular a root cause of an anomalous condition, predict a future state of the datacenter (e.g., a particular property or particular node), identify missing properties, summarize a state of the datacenter, compare states of the datacenter, and the like.

As previously set forth in the Background, datacenters are large clusters of components (e.g., hardware and/or software resources) that are connected to perform operations using massive amounts of data. Keeping these components working efficiently is a complex task as many incidents may occur during the execution of the processes. In order to detect anomalies, problems, and/or failures, or to otherwise assess the health of the system, tools are utilized that extract and gather metrics from the datacenter components. Metrics may include, by way of example only, the temperature of datacenter components, workload, network usage, processor capacity, and the like. The set of metrics at a given timestamp forms the state of the datacenter at the point in time represented by the timestamp.

Keeping datacenter state information completed and fully updated is a challenging task for a number of reasons. For instance, reporting tools often include differing reporting rates among them and/or among different metrics. Further, reporting frequency may not be high enough to accurately assess the datacenter and yet maintaining a high reporting frequency may negatively impact performance of the datacenter. The growing usage of large systems and infrastructures increases the importance of keeping accurate measures in order to find anomalies which may affect the outcome of the tasks executed or to avoid damage to the system itself.

Embodiments of the present disclosure are generally directed to completing incomplete state information for nodes of a datacenter (each node representing a component of the datacenter in a context graph) utilizing historical state information. A context graph is received having a plurality of nodes that correspond to components of a datacenter. The context graph further indicates the relationships among the nodes of the datacenter and each node includes a plurality of properties that correspond to the component represented thereby. An exemplary context graph is illustrated in the schematic diagram of FIG. 1. In the illustrated context graph 100, nodes are represented by circles and connections between nodes are represented by lines. Two exemplary nodes (database 110 and web service 112) are illustrated larger than the others to illustrate an exemplary problem embodiments of the present disclosure seek to solve.

Figure 1:
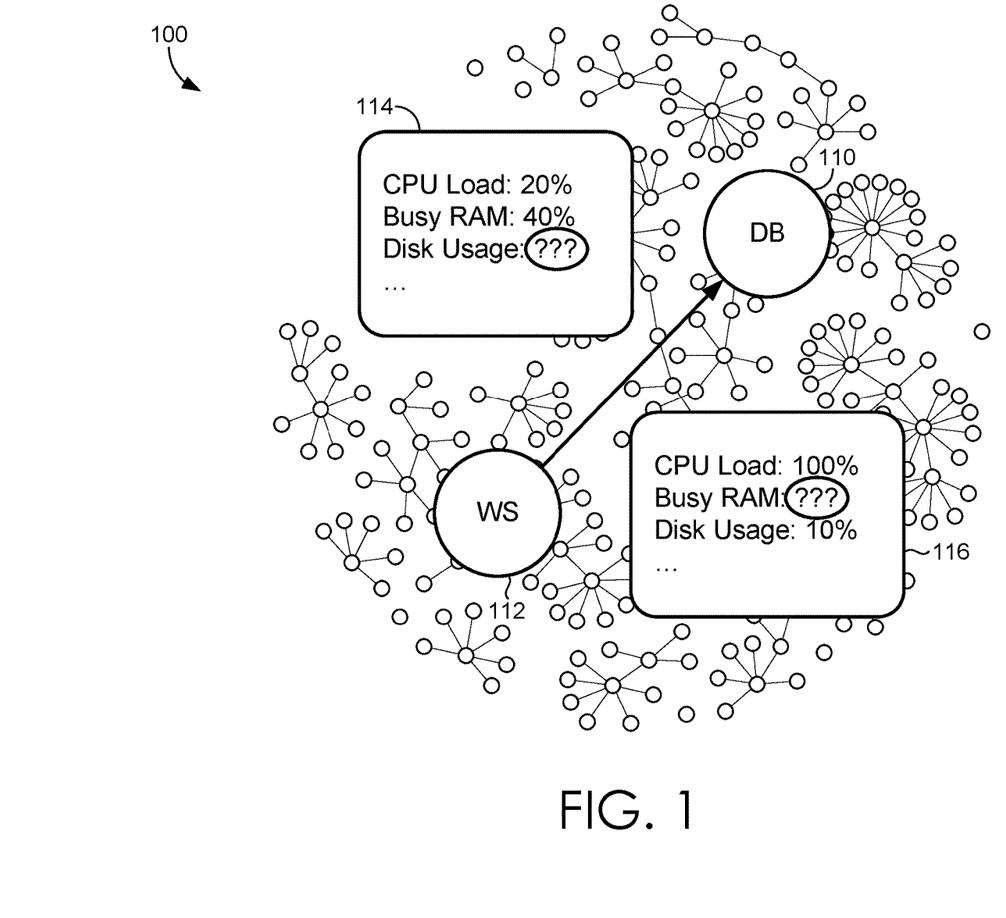
FIG. 1 is a schematic diagram showing an exemplary context graph having nodes with incomplete state information, in accordance with an embodiment of the present disclosure.

Each node of a context graph includes a plurality of properties. Exemplary properties 114 for the database node 110 and exemplary properties 116 for the web service node 112 are illustrated in FIG. 1 and include "CPU Load," "Busy RAM," and "Disk Usage." It will be understood and appreciated by those having ordinary skill in the art that the illustrated properties are presented by way of example only and are not intended to limit the scope of embodiments of the present disclosure. Property data may be incomplete for one or more nodes of context graph. This may occur for any number of reasons, for instance, the frequency at which each property is sampled for each node may not be the same leading to nodes that do not have complete information at a given point in time.

In accordance with embodiments of the present disclosure, it is determined that at least one of the properties for at least one of the nodes of the context graph is incomplete. As illustrated in FIG. 1, each of the database node 110 and web service node 112 include a missing property. The database node 110 is missing a value for the property of Disk Usage and the web service node 112 is missing a value for the property of Busy RAM.

In embodiments, a context hash is derived from the context graph having incomplete information, as more fully described below, and compared to a plurality of subgraph hashes derived from a library of subgraphs. Based upon the comparison, one or more subgraphs are identified that enjoy at least threshold similarity to the context hash. In the event a single similar subgraph is identified, the property information for the single subgraph is imputed to the context graph to complete the incomplete information. In the event more than one similar subgraph is identified, the property information for the identified similar subgraphs is aggregated, for instance, utilizing an average or weight based on a percentage of matching nodes. The aggregated property information for the identified similar subgraphs is imputed to the context graph to complete the incomplete information.

Accordingly, one embodiment of the present disclosure is directed to a method for completing at least a portion of information that is incomplete for nodes in a datacenter. The method includes receiving a context graph indicating a plurality of relationships among a plurality of nodes corresponding to components of a datacenter, each node comprising properties corresponding to a particular component of the datacenter. The method further includes determining at least one of the properties is incomplete for at least one node of the plurality of nodes and comparing a context hash derived from the context graph to a plurality of subgraph hashes derived from a library of subgraphs. Based on the comparing, the method additionally includes identifying one or more subgraph hashes derived from the library of subgraphs that are similar to the context hash derived from the context graph. Still further, the method includes imputing historical properties derived from the one or more subgraph hashes to complete the at least one property that is incomplete for the node of the plurality of nodes.

In another embodiment, the present disclosure is directed to a method for imputing a value for at least one property of a node in a datacenter, the imputed value being derived from values associated with subgraphs corresponding to a set of subgraph hashes. The method includes, for a node in a context graph, determining that a value for at least one property in incomplete for a state of the node at a given point in time. For the node of the context graph, the method further includes determining a hash based on a plurality of properties for the state of the node that have complete property values at the given point in time. The method further includes comparing the hash to a plurality of subgraph hashes derived from a library of subgraphs. Still further, the method includes identifying one or more subgraph hashes derived from the library of subgraphs that are similar to the determined hash. The method additionally includes imputing the value for the at least one property from a subgraph corresponding to the identified one or more subgraph hashes to the node for the state of the node at the given point in time.

In yet another embodiment, the present disclosure is directed to a computerized system that completes state information using graph embeddings for a node in a datacenter. The system includes a processor and a non-transitory computer storage medium storing computer-useable instructions that, when used by the processor, cause the processor to receive a context graph indicating a plurality of relationships among a plurality of nodes corresponding to components of a datacenter. Each node comprises properties that correspond to a particular component of the datacenter. For a node in the context graph, the instructions further cause the processor to determine that a value for a selected property is incomplete for a state of the node at a given point in time. The instructions further cause the processor to determine a plurality of context hashes derived from the context graph based on a plurality of properties for the state of the node that have complete property values at the given point in time. The instructions further cause the processor to compare the plurality of context hashes derived from the context graph to subgraph hashes derived from a library of subgraphs and identify a set of subgraph hashes derived from the library of subgraphs that, when combined, are similar to the plurality of context hashes derived from the context graph. Still further, the instructions cause the processor to aggregate historical properties derived from the set of subgraph hashes to provide the value for the selected property of the node at the given point in time.

Figure 2:
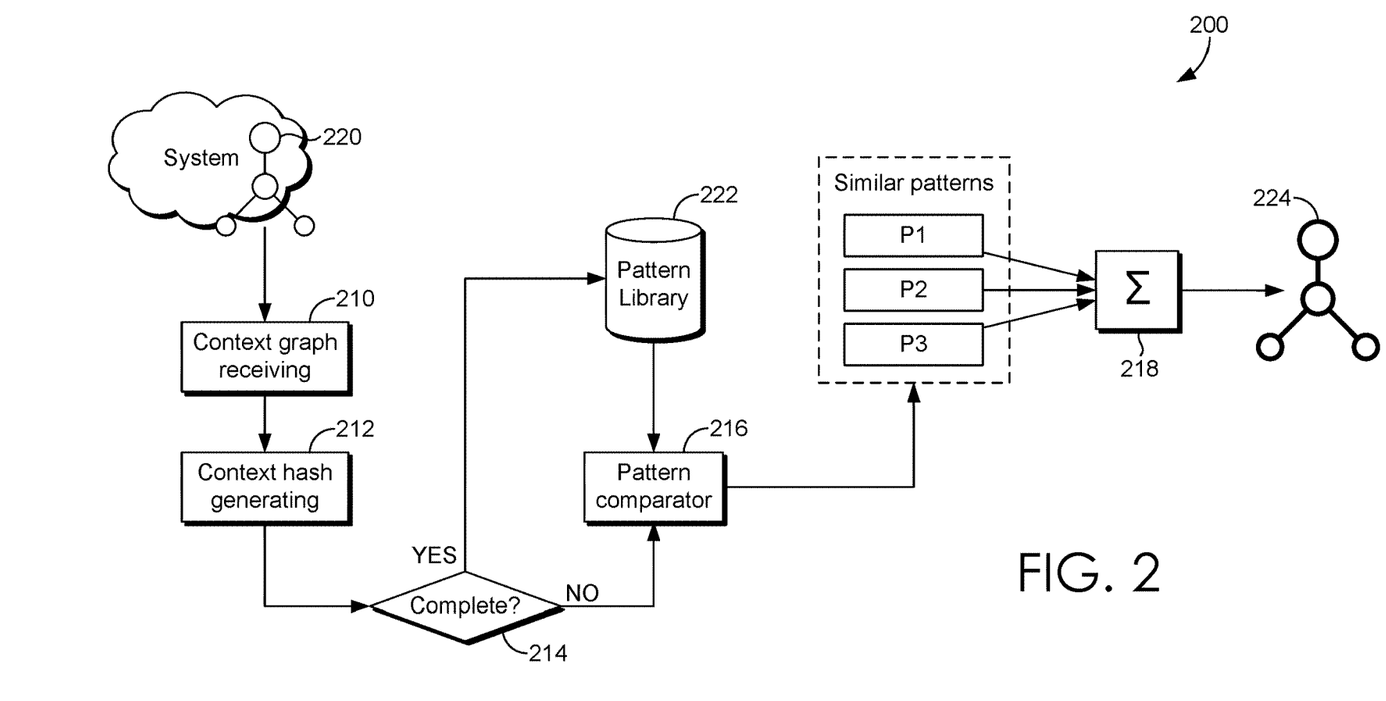
FIG. 2 is a block diagram showing a system configured to complete incomplete state information for nodes in a datacenter, in accordance with an embodiment of the present disclosure.

Referring now to FIG. 2, a block diagram is provided that illustrates a system 200 for completing incomplete state information for nodes in a datacenter, in accordance with an exemplary embodiment of the present disclosure. Generally, the system 200 illustrates an environment in which incomplete state information for nodes of a datacenter may be completed, in accordance with the methods, for instance, illustrated in FIGS. 10 and 11 (more fully described below). Among other components not shown, the state completion system 200 includes a context graph receiving component 210, a context hash generating component 212, a property completion determining component 214, a pattern comparator 216, and a substates aggregator 218. In some embodiments, one or more of the illustrated components/modules may be implemented as stand-alone applications. In other embodiments, one or more of the illustrated components/modules may be implemented via a server or as an Internet-based service. It will be understood by those having ordinary skill in the art that the components/modules illustrated in FIG. 2 are exemplary in nature and in number and should not be construed as limiting. Any number of components/modules may be employed to achieve the desired functionality within the scope of embodiments hereof.

As shown in FIG. 2, the pattern comparator 216 communicates with a pattern library of subgraphs 222. While only a single pattern library of subgraphs 222 is shown in FIG. 2, it should be understood that the pattern comparator 216 may communicate with any number of databases. In embodiments, the pattern library of subgraphs 222 may be in communication with one or more historical databases for one or more datacenters.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory. The state completion system 200 may be implemented via any type of computing device, such as computing device 1200 described below with reference to FIG. 12, for example. In various embodiments, the state completion system 200 may be implemented via a single device or multiple devices cooperating in a distributed environment.

The state completion system 200 generally operates to complete incomplete state information for nodes in a datacenter utilizing historical state information. It should be understood that the state completion system 200 shown in FIG. 2 is an example of one suitable computing system architecture. Each of the components shown in FIG. 2 may be implemented via any type of computing device, such as computing device 1200 described with reference to FIG. 12, for example.

The components of the exemplary state completion system 200 may communicate with each other via a network, which may include, without limitation, one or more local area networks (LANs) and/or wide area networks (WANs). Such networking environments are commonplace in offices, enterprise-wide computer networks, intranets, and the Internet. It should be understood that any number of datacenters and/or state completion engines may be employed by the state completion system 200 within the scope of the present disclosure. Each may comprise a single device or multiple devices cooperating in a distributed environment. Additionally, other components not shown may also be included within the network environment.

Initially, a context graph 220 is received, e.g., by the context graph receiving component 210 of FIG. 2. As described above, a context graph refers to a data structure that depicts connections or relationships between components of the datacenter. The context graph consists of nodes (vertices, points) and edges (arcs, lines) that connect them. Each node represents a component and each edge represents a relationship between the corresponding components. The nodes and edges may be labeled or enriched with data.

Figure 3:
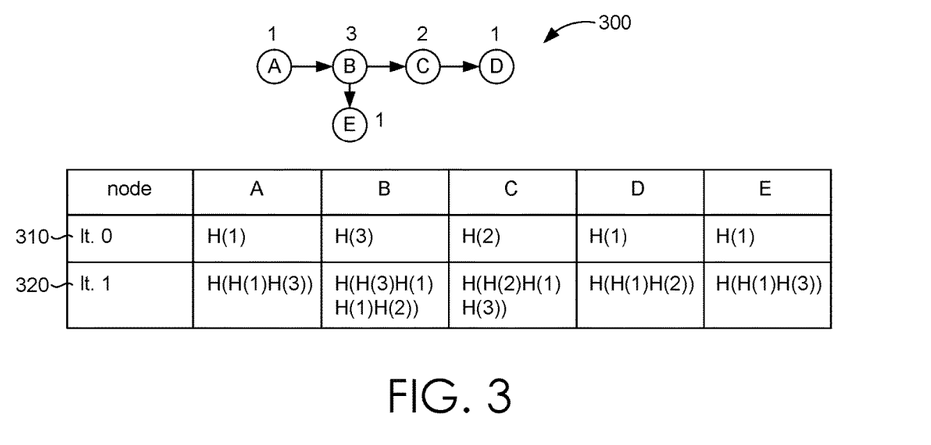
FIG. 3 is an exemplary hash algorithm for context graph nodes using a single property, in accordance with an embodiment of the present disclosure.

A hash or vector representation is generated or built for the received context graph, for instance, by the hash generating component 212 of FIG. 2. Properties utilized for generating a context hash may be collected, for instance, from one or more reports and/or one or more monitoring tools. With reference to FIG. 3, an exemplary hash algorithm is illustrated for context graph nodes using a single property, in accordance with an embodiment of the present disclosure. The hash may be determined by the state completion system 200 of FIG. 2 utilizing the hash algorithm as shown. In this example, a hash may be determined for each node of the context graph or subgraph 300 based on selected properties. The properties may include metrics of the node and/or neighbor-related information (which may be aggregated for multiple neighbor nodes). The neighbor-related information may include, without limitation, a number of neighbors, an absolute number of neighbors with having a particular condition, a relative number of neighbors having a particular condition, a sum/maximum/minimum/average of one or more node properties, and the like. A number of iterations 310, 320 may also be utilized to determine the hashes. The number of iterations may be based on a diameter of the context graph or subgraph, a desired input size, etc. The information associated to a single node for a particular property are the values in its column in the table for each iteration 310, 320.

For example, using a number of neighbors as the selected property, at iteration 0, the hash of node A is represented by H(1) because its only neighbor is node B. Under the same properties, the hash of nodes B, C, D, E are represented by H(3), H(2), H(1), and H(1) because nodes B, C, D, E have 3, 2, 1, 1 neighbors, respectively. In some embodiments, the direction of the edges is ignored. In other embodiments, direction of the edges is utilized as a property.

In the same example, and still referring to FIG. 3, at iteration 1, the hash of node A considers a hash of (the hash of node A and the hash of node B) which can be represented by H(H(1)H(3)). Under the same properties, the hash of nodes B, C, D, E are represented by H(H(3)H(1)H(1)H(2)), H(H(2)H(1)H(3)), H(H(1)H(2)), and H(H(1)H(2)). As can be appreciated, this circular hashing process can be utilized for multiple iterations or depths of the context graph to provide a fingerprint or identifying characteristics of the context graph corresponding to the selected properties of nodes of the context graph which can be utilized to identify similar subgraphs or context graphs.

Figure 4:
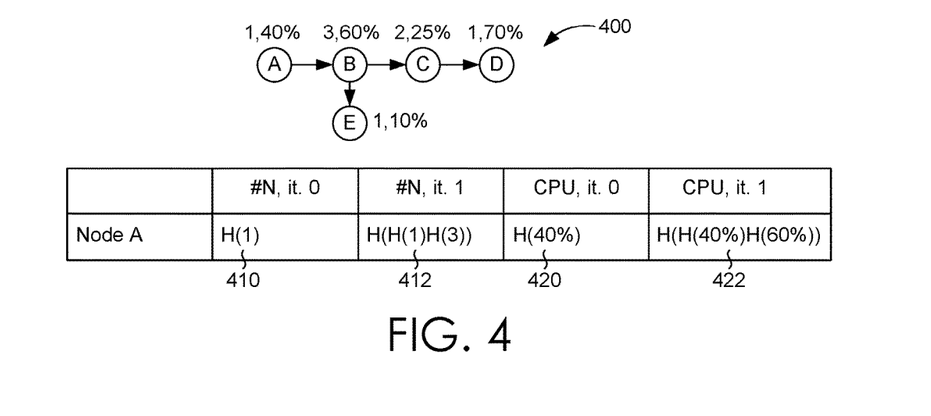
FIG. 4 is an exemplary hash algorithm for context graph nodes using multiple properties, in accordance with embodiments of the present disclosure.

Turning now to FIG. 4, an exemplary hash algorithm for context graph nodes is illustrated using multiple properties, in accordance with an embodiment of the present disclosure. The hash may be determined by the state completion system 200 of FIG. 2 utilizing the hash algorithm as shown. For example, using a number of neighbors as the selected property, at iteration 0, the hash of node A is represented by H(1) 410 because its only neighbor is node B. At iteration 1, the hash of node A considers a hash of (the hash of node A and the hash of node B) which can be represented by H(H(1)H(3)) 412. Similarly, using CPU as the selected property, at iteration 0, the hash of node A is represented by H(40%) 420. At iteration 1, the hash of node A considers a hash of (the hash of node A and the hash of node B) which can be represented by H(H(40)H(60)) 422.

Referring back to FIG. 2, once a context graph has been received and at least one context hash has been generated, it is determined, e.g., by the property completion determining component 214, whether the state information for the received context graph is complete. If the state information is complete, the context graph pattern and associated state information is stored in the pattern library 222 of subgraphs to be utilized in completing incomplete state information for future received context graphs.

If, however, it is determined that one or more properties are incomplete for one or more nodes of the context graph, the context graph having the incomplete state information and at least a portion of the corresponding context hashes is provided to the pattern comparator 216. It should be noted that incomplete state information may comprise missing information or null values inserted therein. It also should be noted that while the context graph may have incomplete information for one or more of the nodes it represents, the corresponding context hashes are generated utilizing complete property information. That is, if a particular property is incomplete for a state of a node at a given point in time, that particular property is not utilized to generate the corresponding context hashes, the context hashes instead being generated utilizing subsets of the node properties that contain complete information.

It will be understood and appreciated by those having ordinary skill in the art that the completion determining component 214 may determine that the context graph 220 includes incomplete information prior to generation of context hashes (by the context hash generating component 212). Any and all such variations, and any combination thereof, are contemplated to be within the scope of embodiments of the present disclosure.

Figure 5:
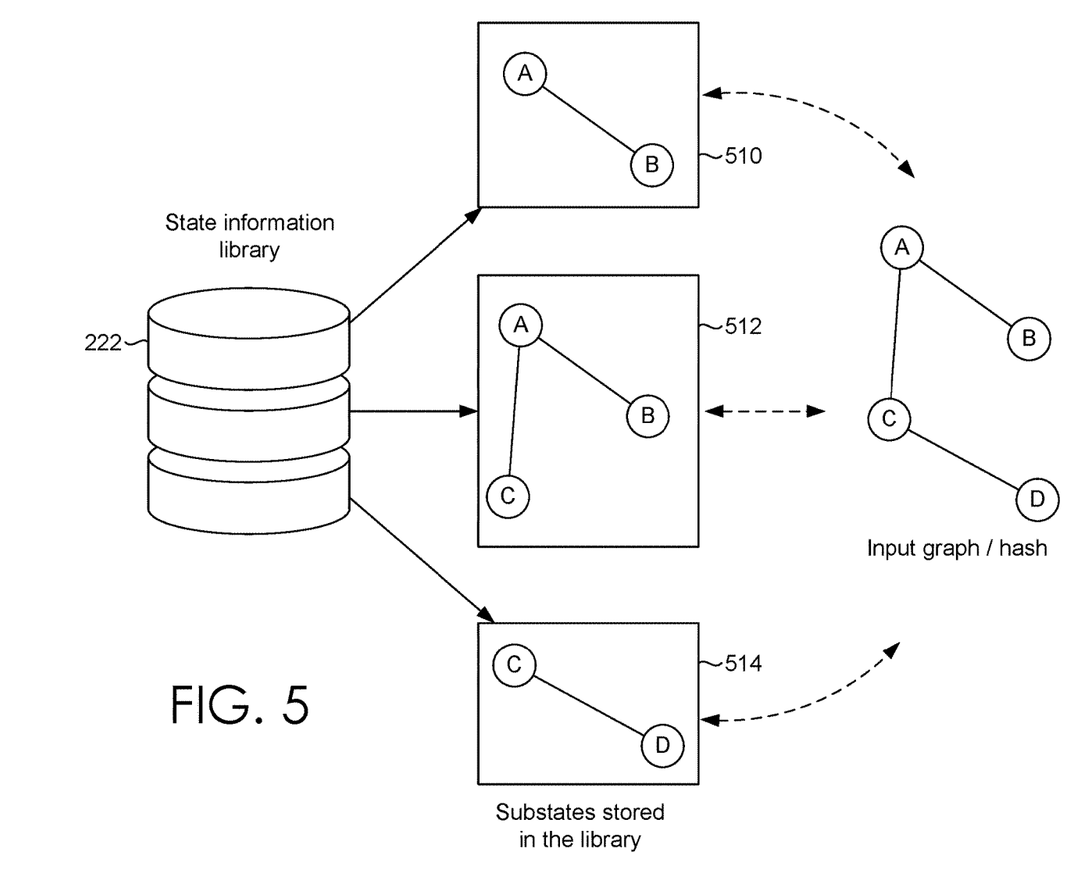
FIG. 5 is a schematic diagram illustrating the comparing of a context hash derived from an exemplary context graph to subgraph hashes derived from a library of subgraphs, in accordance with embodiments of the present disclosure.
Figure 6:
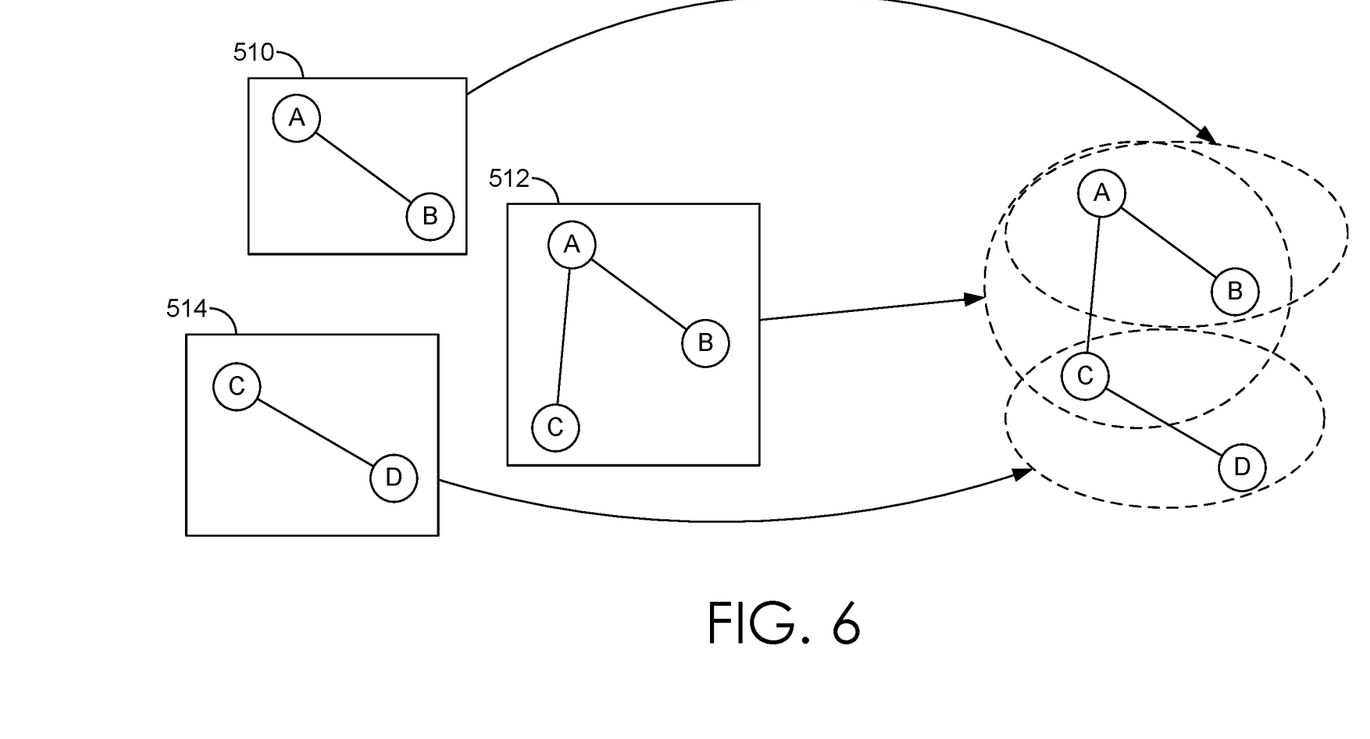
FIG. 6 is a schematic diagram illustrating the imputation of a value for at least one property of a node in a datacenter, in accordance with embodiments of the present disclosure.

The pattern comparator 216 compares the context hash or hashes (output from the context hash generating component 212) to subgraph hashes derived from the pattern library 222 of subgraphs, as illustrated in the schematic diagram of FIG. 5. Based on the comparing, one or more subgraph hashes are identified that, when aggregated, enjoy at least threshold similarity to the input context hash. In the example illustrated in FIG. 5, three (3) subgraphs 510, 512, 514 are identified that satisfy the threshold similarity. FIG. 6 illustrates the aggregation of the three similar subgraphs 510, 512, 514 to approximate the input context graph.

Figure 7:
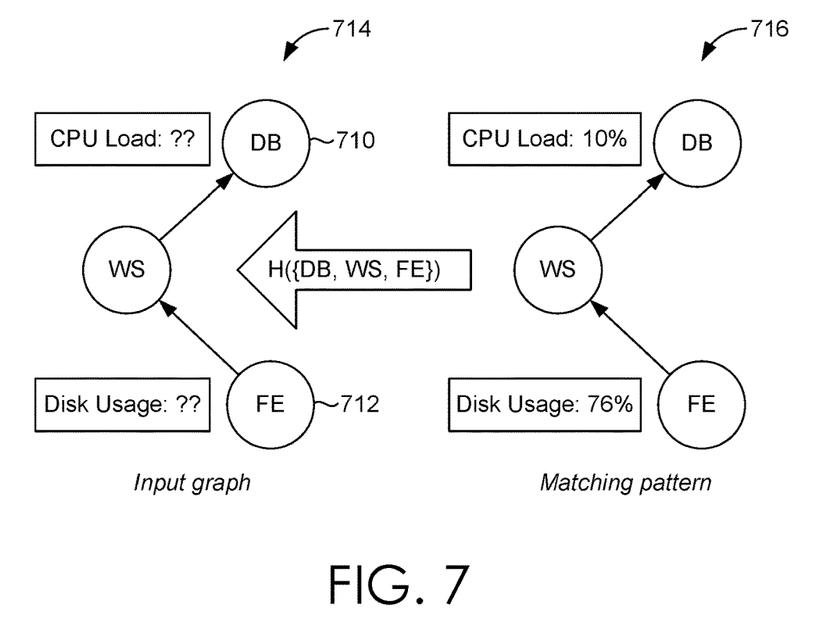
FIGS. 7 and 8 are schematic diagrams illustrating the completion of incomplete state information when a single matching subgraph is identified from the library of subgraphs, in accordance with embodiments of the present disclosure.
Figure 8:
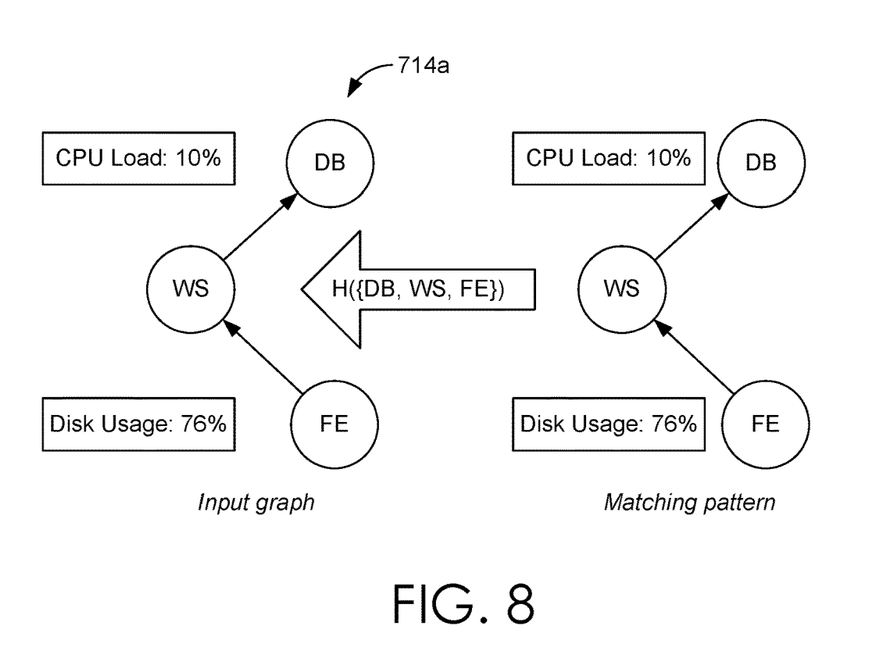

Referring back to FIG. 2, the identified similar subgraph hashes, including the property information corresponding thereto, are aggregated, for instance, by the substates aggregator 218. In the event a single similar subgraph is identified, the property information for the single subgraph is imputed to the context graph to complete the incomplete information. This scenario is illustrated in FIGS. 7 and 8. In FIG. 7, CPU Load information is incomplete for a database node 710 and Disk Usage information is incomplete from a front end node 712 of an input context graph 714. As only a single similar subgraph hash 716 was identified, the CPU Load of 10% is imputed by the substates aggregator (216 of FIG. 2) to the database node 710 and the Disk Usage of 76% is imputed by the substates aggregator (216 of FIG. 2) to the front end node 712. The resultant completed context graph 714a is illustrated in FIG. 8.

Figure 9:
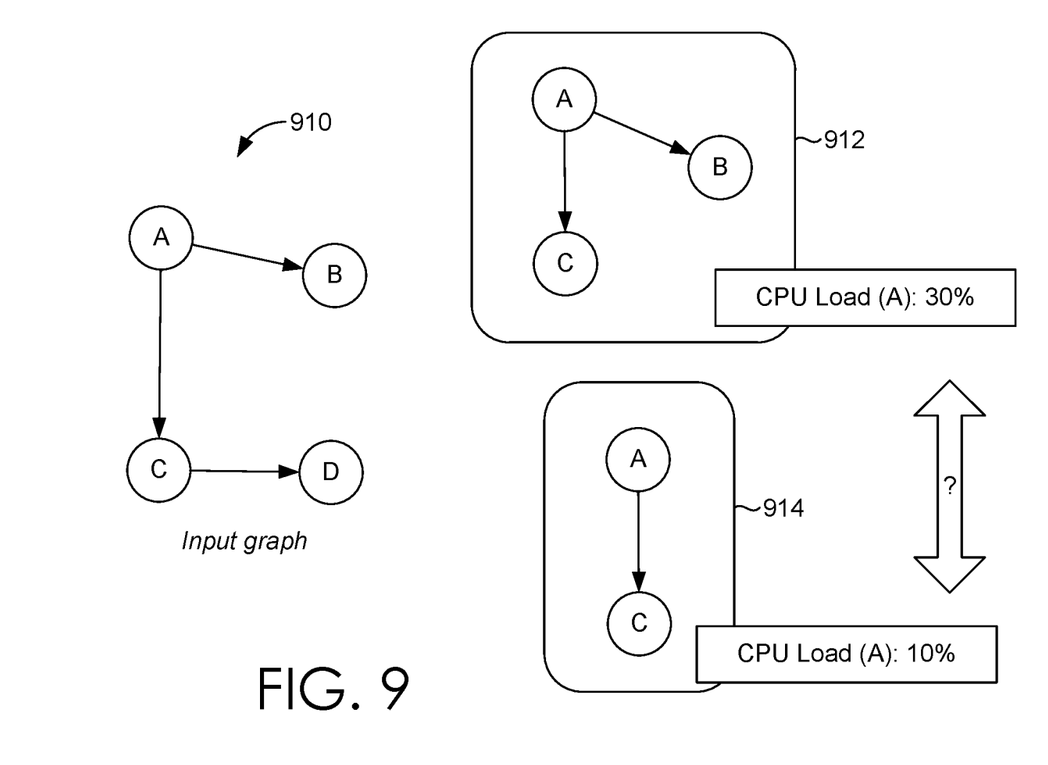
FIG. 9 is a schematic diagram illustrating the completion of incomplete state information when a plurality of matching subgraphs is identified from the library of subgraphs, the information corresponding to each matching subgraph being aggregated, in accordance with embodiments of the present disclosure.

In the event more than one similar subgraph is identified, the property information for the identified similar subgraphs is aggregated (e.g., utilizing the substates aggregator 218 of FIG. 2). This scenario is illustrated in FIG. 9. In the illustrated example, CPU Load for node A is missing in the input graph 910. Two similar subgraphs 912, 914 have been identified. A first similar subgraph 912 includes a CPU Load for node A of 30%. A second similar subgraph 914 includes a CPU Load for node A of 10%. The property information for the first and second similar subgraphs 912, 914 may be aggregated in a number of ways in accordance with embodiments of the present disclosure. For instance, an average may be determined between the matching property values, rendering the imputed CPU Load for node A of the input context graph 20% in the illustrated example. In another instance, a weighted aggregation may be employed, for instance, based on a percentage of matching nodes among the input context graph and the similar subgraphs. In this instance, the first similar subgraph 912 enjoys three nodes in common with the context graph while the second similar subgraph 914 enjoys only two nodes in common. Thus, utilizing this type of weighting, the property value for the first similar subgraph 912 would be more heavily weighted than the property value (10%) for the second similar subgraph. The result would be a number between 30% and 10% but closer to 30% than 10% (i.e., higher than 20%).

In both of the previous instances, the imputed property value for the missing property of the input context graph node was a single value. In embodiments, instead of a single value, a probability distribution may be output instead of a single value. In this way, a user will have more visibility into the confidence with which a value may be imputed.

It will be understood and appreciated by those having ordinary skill in the art that any number of aggregation methods may be utilized, resulting in single values or multiple values or distributions, within the scope of embodiments of the present disclosure. Embodiments hereof are not intended to be limited to any particular aggregation method or methods herein described.

Returning back to FIG. 2, the output of the state completion system 200 is a context graph 224 having more complete state information.

Figure 10:
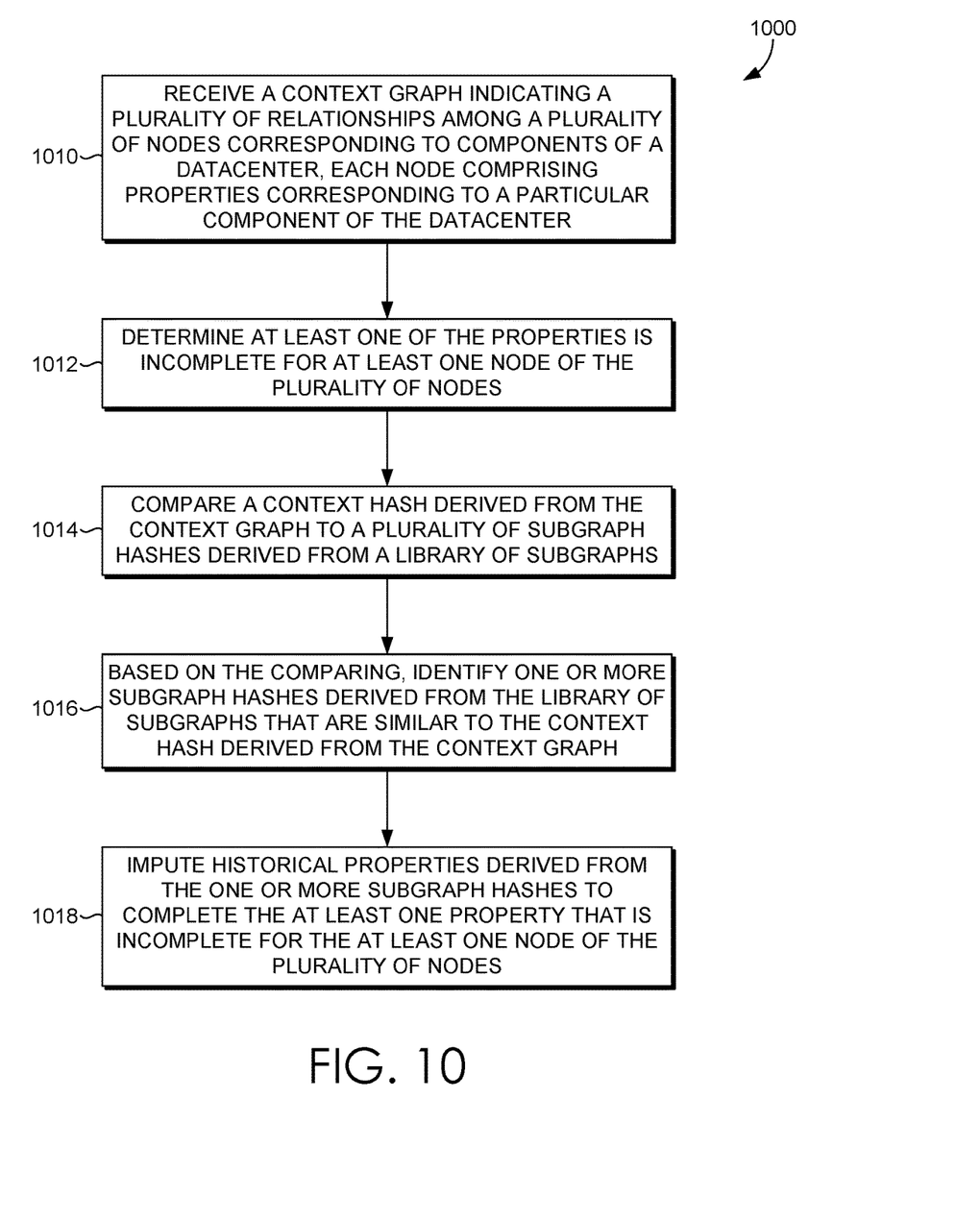
FIG. 10 is a flow diagram illustrating an exemplary method for completing at least a portion of information that is incomplete for nodes in a datacenter, in accordance with embodiments of the present disclosure.

Turning now to FIG. 10, a flow diagram is illustrated showing an exemplary method 1000 for completing at least a portion of information that is incomplete for nodes in a datacenter, in accordance with embodiments of the present disclosure. For instance, the method 1000 may be employed utilizing the state completion system 200 of FIG. 2. As shown at step 1010, a context graph is received. The context graph indicates a plurality of relationships among a plurality of nodes that correspond to components of a datacenter. Each node comprises properties corresponding to a particular component of the datacenter. As shown at step 1012, it is determined that at least one of the properties is incomplete for at least one node of the plurality of nodes.

As shown at step 1014, a context hash derived from the context graph is compared to a plurality of subgraph hashes derived from a library of subgraphs. Based on the comparing, as shown at step 1016, one or more subgraph hashes derived from the library of subgraphs is identified. The identified one or more subgraph hashes enjoy at least threshold similarity to the context hash derived from the context graph.

As shown at step 1018, historical properties derived from the set of subgraph hashes are imputed to complete the at least one property that is incomplete for the at least one node of the plurality of nodes. In embodiments, the historical properties derived from the set of subgraph hashes may be aggregated based upon one or more of an average and a weight based on a percentage of matching nodes. In embodiments a probability distribution may be provided to complete the at least one property instead of a single value.

Figure 11:
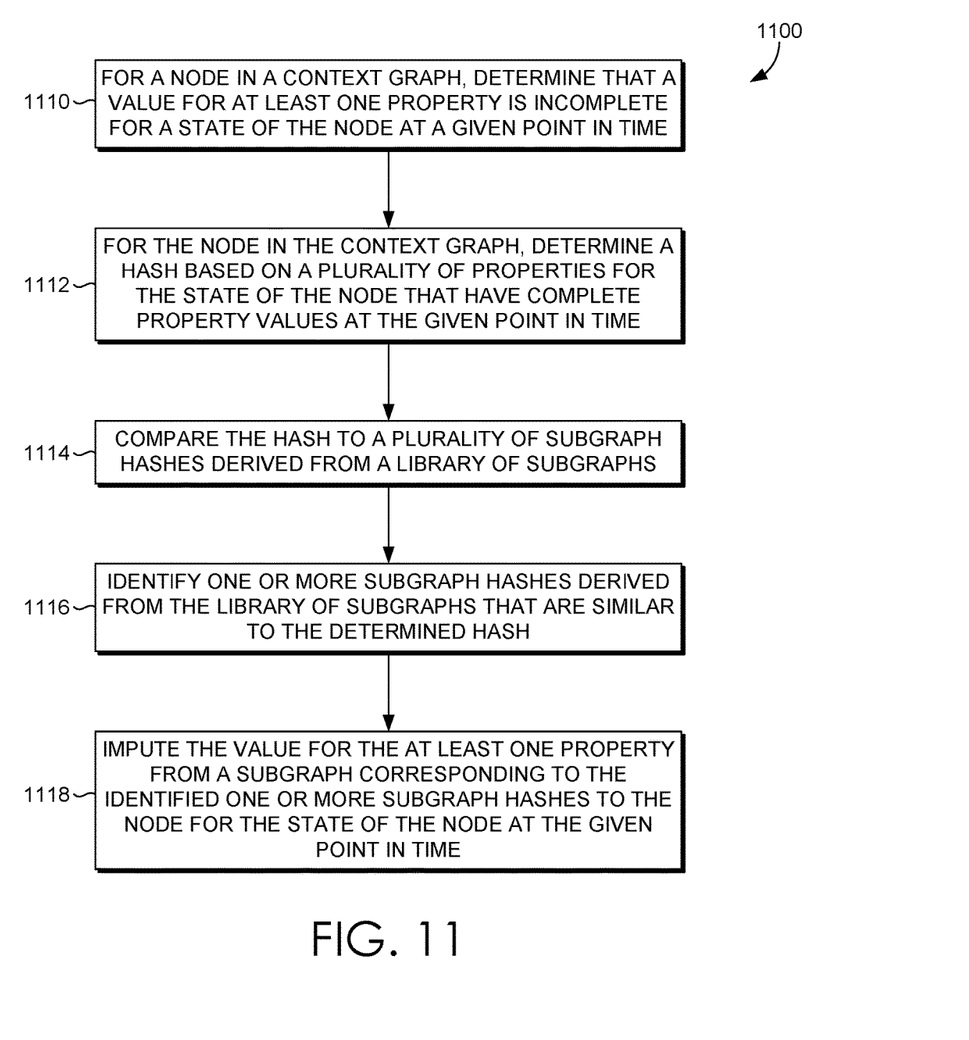
FIG. 11 is a flow diagram illustrating an exemplary method for aggregating properties derived from a set of subgraph hashes to complete incomplete data for a selected property of a node for a state of the datacenter, in accordance with embodiments of the present disclosure.

With reference to FIG. 11, a flow diagram is illustrated showing another exemplary method 1100 for completing incomplete state information for nodes in a datacenter, in accordance with embodiments of the present disclosure. By way of example, the method 1100 may be employed utilizing the state completion system 200 of FIG. 2. As shown at step 1110, for a node in a context graph, it is determined that a value for at least one property is incomplete for a state of the node at a given point in time. As shown at step 1112, one or more hashes are determined based on a plurality of properties for the state of the node that have complete property values at the given point in time; that is, the at least one property for which state information is incomplete is not utilized in generating a hash.

As shown at step 1114, the hash is compared to subgraph hashes derived from a library of subgraphs and, as shown at step 1116, one or more subgraph hashes derived from the library of subgraphs is identified. The identified subgraph hashes enjoys at least threshold similarity to the context hash derived from the context graph.

As shown at step 1118, a value for the at least one property derived from a subgraph corresponding to the identified one or more subgraph hashes are imputed to provide the value for the selected property of the node at the given point in time. In embodiments, the properties derived from the one or more subgraph hashes may be aggregated based upon, by way of example only, one or more of an average and a weight based on a percentage of matching nodes. In embodiments a probability distribution may be provided to complete the value for the selected property of the node instead of a single value.

Figure 12:
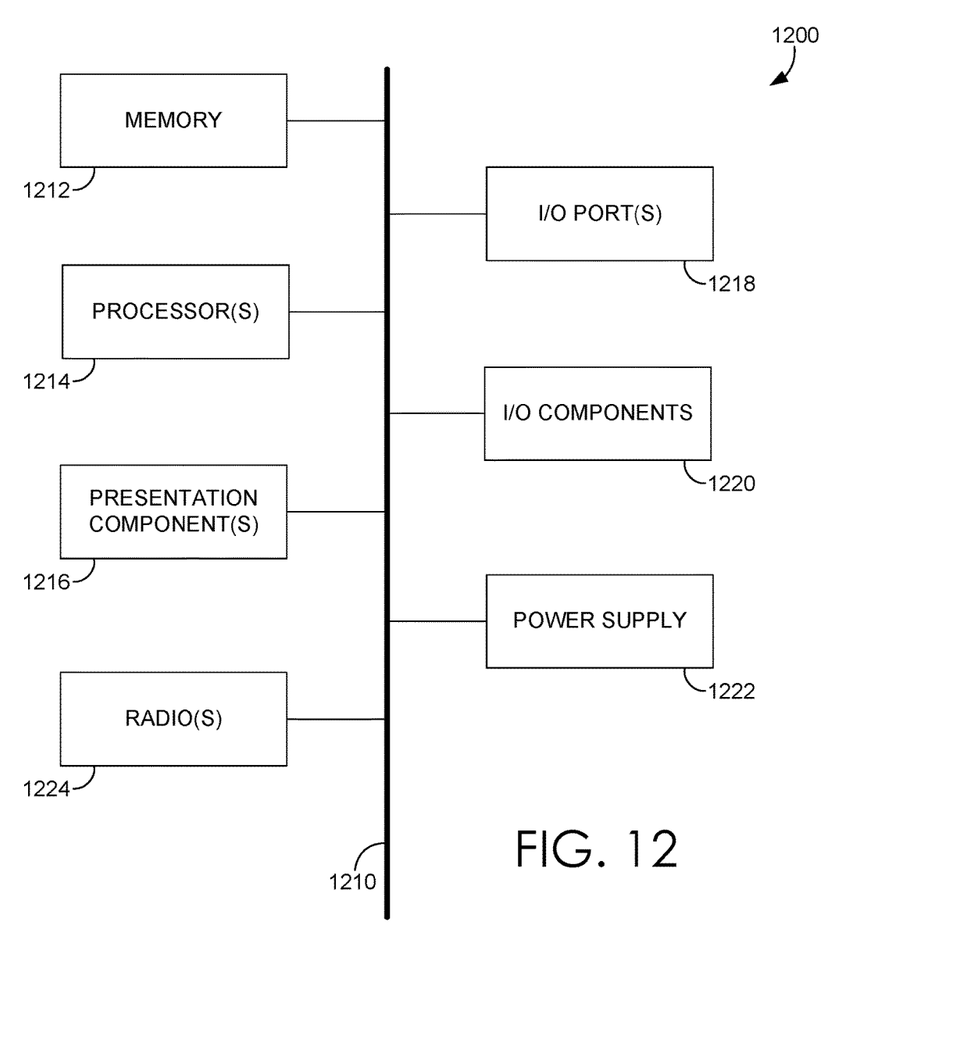
FIG. 12 is a block diagram of an exemplary computing environment suitable for use in implementing embodiments of the present disclosure.

Having described embodiments of the present disclosure, an exemplary operating environment in which embodiments of the present disclosure may be implemented is described below in order to provide a general context for various aspects of the present disclosure. Referring to FIG. 12 in particular, an exemplary operating environment for implementing embodiments of the present disclosure is shown and designated generally as computing device 1200. Computing device 1200 is but one example of a suitable computing environment and is not intended to suggest any limitation as to the scope of use or functionality of the inventive embodiments. Neither should the computing device 1200 be interpreted as having any dependency or requirement relating to any one or combination of components illustrated.

The inventive embodiments may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The inventive embodiments may be practiced in a variety of system configurations, including handheld devices, consumer electronics, general-purpose computers, more specialty computing devices, etc. The inventive embodiments may also be practiced in distributed computing environments where tasks are performed by remote-processing devices that are linked through a communications network.

With reference to FIG. 12, computing device 1200 includes a bus 1210 that directly or indirectly couples the following devices: memory 1212, one or more processors 1214, one or more presentation components 1216, one or more input/output (I/O) ports 1218, one or more input/output (I/O) components 1220, and an illustrative power supply 1222. Bus 1210 represents what may be one or more busses (such as an address bus, data bus, or combination thereof). Although the various blocks of FIG. 12 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 12 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 10 and reference to "computing device."

Computing device 1200 typically includes a variety of computer-readable media. Computer-readable media can be any available media that can be accessed by computing device 1200 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1200. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 1212 includes computer-storage media in the form of volatile and/or nonvolatile memory. The memory may be removable, non-removable, or a combination thereof. Exemplary hardware devices include solid-state memory, hard drives, optical-disc drives, etc. Computing device 1200 includes one or more processors that read data from various entities such as memory 1212 or I/O components 1220. Presentation component(s) 1216 present data indications to a user or other device. Exemplary presentation components include a display device, speaker, printing component, vibrating component, etc.

I/O ports 1218 allow computing device 1200 to be logically coupled to other devices including I/O components 1220, some of which may be built in. Illustrative components include a microphone, joystick, game pad, satellite dish, scanner, printer, wireless device, etc. The I/O components 1220 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1200. The computing device 1200 may be equipped with depth cameras, such as stereoscopic camera systems, infrared camera systems, RGB camera systems, and combinations of these, for gesture detection and recognition. Additionally, the computing device 1200 may be equipped with accelerometers or gyroscopes that enable detection of motion. The output of the accelerometers or gyroscopes may be provided to the display of the computing device 1300 to render immersive augmented reality or virtual reality.

As can be understood, embodiments of the present disclosure provide for completing incomplete state information for nodes in a datacenter. The present disclosure has been described in relation to particular embodiments, which are intended in all respects to be illustrative rather than restrictive. Alternative embodiments will become apparent to those of ordinary skill in the art to which the present disclosure pertains without departing from its scope.

From the foregoing, it will be seen that this disclosure is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. A method comprising:
   receiving a context graph indicating a plurality of relationships among a plurality of nodes corresponding to hardware and software components of a datacenter, each node comprising properties corresponding to a particular component of the datacenter;
   determining at least one of the properties is null or missing for at least one node of the plurality of nodes;
   comparing a context hash derived from the context graph to a plurality of subgraph hashes derived from a library of subgraphs, each subgraph hash of the plurality of subgraph hashes and each subgraph of the subgraphs correspond to a respective portion of a plurality of portions of the context graph;
   based on the comparing, identifying one or more subgraph hashes derived from the library of subgraphs that are similar to the context hash derived from the context graph; and
   imputing, in the at least one node of the plurality of nodes, historical properties derived from the one or more subgraph hashes to complete the at least one property that is null or missing for the at least one node of the plurality of nodes.

2. The method of claim 1, wherein identifying one or more subgraph hashes derived from the library of subgraphs comprises identifying a set of subgraph hashes derived from the library of subgraphs that, when aggregated, are similar to the context hash derived from the context graph.

3. The method of claim 2, further comprising aggregating the historical properties from subgraphs that correspond to the set of subgraph hashes and imputing at least a portion of the aggregated historical properties to complete the at least one property that is null or missing for the at least one node of the plurality of nodes.

4. The method of claim 3, wherein the historical properties are aggregated based on an average.

5. The method of claim 3, wherein the historical properties are aggregated utilizing a weight based on a percentage of matching nodes.

6. The method of claim 1, further comprising providing a probability distribution for the at least one property that is null or missing for the at least one node of the plurality of nodes.

7. The method of claim 1, further comprising receiving a plurality of historical properties from a historical database corresponding to the library of subgraphs.

8. The method of claim 1, further comprising:
   receiving the historical properties from one or more of at least one report and at least one monitoring tool; and
   building the context graph utilizing the received properties.

9. The method of claim 1, wherein the library of subgraphs corresponds to historical data collected from multiple datacenters.

10. A computerized system:
    a processor; and
    a non-transitory computer storage medium storing computer-useable instructions that, when used by the processor, cause the processor to:
    receive a context graph indicating a plurality of relationships among a plurality of nodes corresponding to components of a datacenter, each node comprising properties that include a particular resource consumption state of a particular hardware component of the datacenter;
    for a node in the context graph, determine that a value for at a selected property of the properties is null or missing for a resource consumption state of the node at a given point in time;
    for the node in the context graph, determine a plurality of context hashes derived from the context graph based on a plurality of properties for the resource consumption state of the node that have complete property values at the given point in time;
    compare the plurality of context hashes derived from the context graph to subgraph hashes derived from a library of subgraphs;
    identify a set of subgraph hashes derived from the library of subgraphs that, when combined, are similar to at least a portion of the plurality of context hashes derived from the context graph; and
    aggregate historical resource consumption properties derived from subgraphs corresponding to the set of subgraph hashes to provide the value for the selected property that is null or missing of the node at the given point in time.

* * * * *